(12) United States Patent
Wolf

(10) Patent No.: US 6,738,579 B2
(45) Date of Patent: May 18, 2004

(54) SYNCHRONOUS DIGITAL COMMUNICATIONS SYSTEM

(75) Inventor: Michael Wolf, Mundelsheim (DE)

(73) Assignee: Alcatel, Paris (FR)

( * ) Notice: Subject to any disclaimer, the term of this patent is extended or adjusted under 35 U.S.C. 154(b) by 582 days.

(21) Appl. No.: 09/729,782

(22) Filed: Dec. 6, 2000

(65) Prior Publication Data

US 2001/0038476 A1 Nov. 8, 2001

(30) Foreign Application Priority Data

Dec. 11, 1999 (DE) .......................... 199 59 813

(51) Int. Cl.[7] .................. H04J 14/00; H04L 12/28
(52) U.S. Cl. .................. 398/50; 398/79; 398/48; 398/91; 398/154; 370/503; 370/907; 375/356
(58) Field of Search .................. 398/50, 48, 79, 398/91, 154; 370/907, 503; 375/356

(56) References Cited

U.S. PATENT DOCUMENTS

| | | | | |
|---|---|---|---|---|
| 5,886,996 A | * | 3/1999 | Wolf | 370/507 |
| 5,917,870 A | * | 6/1999 | Wolf | 375/356 |
| 6,529,300 B1 | * | 3/2003 | Milton et al. | 398/59 |
| 6,535,313 B1 | * | 3/2003 | Fatehi et al. | 398/101 |
| 6,587,470 B1 | * | 7/2003 | Elliot et al. | 370/404 |
| 2002/0037013 A1 | * | 3/2002 | Grammel | 370/430 |

* cited by examiner

*Primary Examiner*—Kinfe-Michael Negash
(74) *Attorney, Agent, or Firm*—Sughrue Mion, PLLC

(57) ABSTRACT

The synchronous digital communications system according to the invention serves to transmit electric signals optically. The electric signals to be transmitted are converted from electrical to optical form (E/O1, E/O2, E/On) and are transmitted using wavelength division multiplexing (WDM) or dense wavelength division multiplexing (DWDM). At least one optical connection is configured as a nonswitched connection using at least one wavelength per transmission section between optical network elements or optical and electrical network elements, and serves to transmit synchronization and information signals. This has the advantage that independently of the switched communication links, synchronization is constantly ensured throughout the network. Each network element (NE1, NE2, NE3) has at least one interface unit that is reserved for synchronization and that continuously receives signals at the wavelength ($\lambda_1$) reserved for synchronization.

7 Claims, 1 Drawing Sheet

SYNCHRONOUS DIGITAL COMMUNICATIONS SYSTEM

BACKGROUND OF THE INVENTION

This invention relates to a synchronous digital communications system for optically transmitting electric signals and to a method of optically transmitting electric signals.

A synchronous digital communications system is based, for example, on a standard for synchronous digital hierarchy (SDH/SONET standard). In such a digital communications system, individual network elements are interconnected by different transmission media (e.g., copper cables, optical fiber waveguides, or radio links). A network element is, for example, an exchange for a public switched telephone network, a cross-connect, or an add/drop multiplexer. To synchronize the network elements, two techniques are known: master-slave synchronization and mutual synchronization.

The master-slave technique, also referred to as hierarchical synchronization, uses a unique primary reference clock for synchronization of a first hierarchical level of network elements, also referred to as nodes. These nodes give their derived clocks to the next level nodes, and so on. In the mutual synchronization technique, all nodes are at a peer level interconnected by the existing digital links. Each node calculates a mean phase value of the incoming clocks and its own internal clock.

From DE 44 46 511 it is known to avoid timing loops by grouping interface units of each network element that are used for synchronization in two classes, thereby defining a synchronization hierarchy. The interface units of one of the classes ignore received synchronization signals, and the interface units of the other class transmit synchronization signals (clock references).

Network elements have a number of interface units, which generally all serve to receive and transmit information signals, i.e., speech, data. Some predefined interface units additionally serve to receive and/or transmit synchronization signals. All-electric synchronous digital communications systems have nonswitched physical connections. A synchronization hierarchy is defined by predetermined paths. If section-by-section radio or point-to-point optical transmission is used, the electric signals (information+synchronization) are switched through transparently. In this way, the network element interface units used for synchronization always receive the necessary synchronization signals. Even if no information is transmitted in the meantime, the connections between the network elements are maintained, for example by transmitting default messages, so that continuous synchronization is ensured.

A new situation arises if during section-by-section optical transmission, no time-invariable through-switching takes place. Then, optical connections are no longer permanently assigned to wavelengths. A flexible and time-variable assignment of optical channels to wavelengths is possible. For example, an optical channel for transmitting a first message packet is implemented by a first switched optical connection using a first wavelength, and an optical channel for transmitting a second message packet is implemented by a second switched optical connection using a second wavelength. If network elements with switching properties, such as optical cross-connects, are used in conjunction with wavelength-division multiplexing, arbitrary, time-variable optical channels can be created for transmitting information signals, such as SDH or SONET signals. For example, a first optical connection for creating a first optical channel is used in a first time period to transmit messages from a first network element to a second network element, with an optical cross-connect interposed between the network elements. The first optical connection is implemented using a first wavelength, for example. Via the interface unit assigned to the first wavelength, the second network element synchronizes itself, i.e., the synchronization clock, which corresponds to a bit-rate clock, is used for all interface units of the second network element. If in a second time period, the optical cross-connect uses the first wavelength for a second optical connection to create a second optical channel for transferring information from the first network element to a third network element, the connection to the second network element via the first wavelength is interrupted. The second network element can no longer synchronize itself in the second time period. Even if the second network element received information and/or synchronization signals over a second or third optical connection, it could not synchronize itself, because only the interface unit assigned to the first wavelength is reserved for the purpose of accomplishing synchronization for all interface units. Instead of using one interface unit, synchronization can also be achieved using two or three interface units, for example by means of an additional selection facility that selects the clock of the best quality. Through the use of three interface units for synchronization purposes in conjunction with three wavelengths, the probability that no synchronization is possible can be minimized but cannot be reduced to zero.

SUMMARY OF THE INVENTION

The invention proposes a synchronous digital communications system and a method of optically transmitting electric signals, as described more fully below.

The synchronous digital communications system serves to transmit electric signals optically. The electric signals to be transmitted are converted from electrical to optical form and are then transmitted using wavelength-division multiplexing (WDM) or dense wavelength-division multiplexing (DWDM). Using at least one wavelength per transmission section between optical network elements or between optical and electrical network elements, at least one optical connection is implemented as a nonswitched connection and serves to transfer synchronization and information signals. This has the advantage that independently of the switched communication links, synchronization is constantly ensured throughout the system. Each network element has at least one interface unit that is reserved for synchronization and that constantly receives signals on the wavelength reserved for synchronization.

The synchronous digital communications system comprises, for example, at least three network elements interconnected by optical lines, each of the network elements comprising at least one electrical-to-optical converter and at least one optical-to-electrical converter. At least one optical cross-connect is connected between the network elements. Each optical cross-connect is adapted to use optical connections with the exception of the at least one nonswitched optical connection to route signals from one network element to another. The cross-connect performs switching operations for communication links. With respect to the switching, however, the cross-connect is limited to the existing wavelengths less the wavelengths used for synchronization.

In a preferred embodiment, the synchronous digital communications system comprises at least three network elements designed as SDH or SONET elements that are interconnected by optical lines. Between the network elements, hierarchical synchronization is established by configuring at least one optical connection as a nonswitched connection for transmitting a synchronization clock generated in a primary reference source, and clocks derived therefrom, over predetermined paths. For instance, a reference clock generated in a first network element is transmitted for synchronization purposes to a second network element using a first reserved, nonswitched wavelength. A clock derived from the received reference clock in the second network element is transmitted to a third network element using a second reserved, likewise nonswitched wavelength. Between the first and second network elements, the first wavelength is then reserved for the transmission of synchronization signals but can simultaneously be used for the transfer of information, maintenance and/or management signals. All other available wavelengths, e.g., twenty wavelengths, are used for the transfer of information signals over switched optical connections. Between the second and third network elements, the second wavelength is then reserved for the transmission of synchronization signals and can additionally be used for the transmission of information. Regardless of whether information is being transmitted at the second wavelength, synchronization signals are always transmitted. All other available wavelengths, e.g., the first and the third through the twentieth wavelengths, are used for the transfer of information signals over switched optical connections. Synchronization is guaranteed throughout the system.

Alternatively to hierarchical synchronization, the invention can also be used with mutual synchronization. The synchronous digital communications system comprises at least three network elements designed as SDH or SONET elements that are interconnected by optical lines. Between the network elements, mutual synchronization is implemented by configuring at least one optical connection as a nonswitched connection for transmitting at least one synchronization clock generated in at least one primary reference source over predetermined paths. In determining the paths, care must be taken to ensure that no timing loops are created. In each of the paths, at least one selected wavelength is used exclusively for the transfer of synchronization signals. Thus, there is at least one nonswitched auxiliary optical connection on each link between two network elements that is used for synchronization purposes and can additionally be used to transfer information, maintenance, and/or management signals.

In another preferred embodiment of the invention, the synchronous digital communications system comprises at least three network elements as well as a synchronization manager and a connection manager, the network elements being interconnected by optical lines. The synchronization manager is adapted to configure dedicated, nonswitched synchronization links between the at least three network elements. The connection manager is adapted to configure communication links from a pool of optical connections in which the dedicated synchronization links are marked, without switching the synchronization links. The synchronization manager and the connection manager perform network management functions. During system design, the number of network elements, the number of possible optical connections, etc. are determined. For the synchronization, a topology is defined in the synchronization manager. For instance, master-slave synchronization is chosen. To implement this synchronization, the necessary paths are determined. For each path, a nonswitched optical connection is configured using at least one wavelength. In each network element, at least one interface unit is selected for synchronization. Each of the selected interface units is assigned a nonswitched wavelength for synchronization purposes. This wavelength and the associated path are configured to create a nonswitched path over which synchronization signals are constantly transmitted. After completion of the configuration of the synchronization links, the configuring of the communication links takes place. Information is transmitted over switched communication links and can additionally be transmitted over the synchronization links. The wavelengths reserved for the synchronization links are usable by the connection manager only limitedly, because they are not switchable.

In the novel method of optically transmitting electric signals, the electric signals to be transmitted are converted from electrical to optical form and then transmitted using wavelength-division multiplexing, with at least one optical connection being configured as a nonswitched connection using at least one wavelength and serving to continuously transmit synchronization signals, and at least one further optical connection being switched using at least one further wavelength. Each switched optical connection is used for the transfer of information signals. The method can be used in a synchronous communications system with at least three network elements interconnected by optical lines. Dedicated, nonswitched synchronization links are then connected between the at least three network elements for the permanent transmission of at least one synchronization clock.

BRIEF SUMMARY OF THE DRAWINGS

The invention will become more apparent from the following description of an embodiment taken in conjunction with the accompanying drawing, in which.

DETAILED DESCRIPTION OF THE INVENTION

Figure 1:
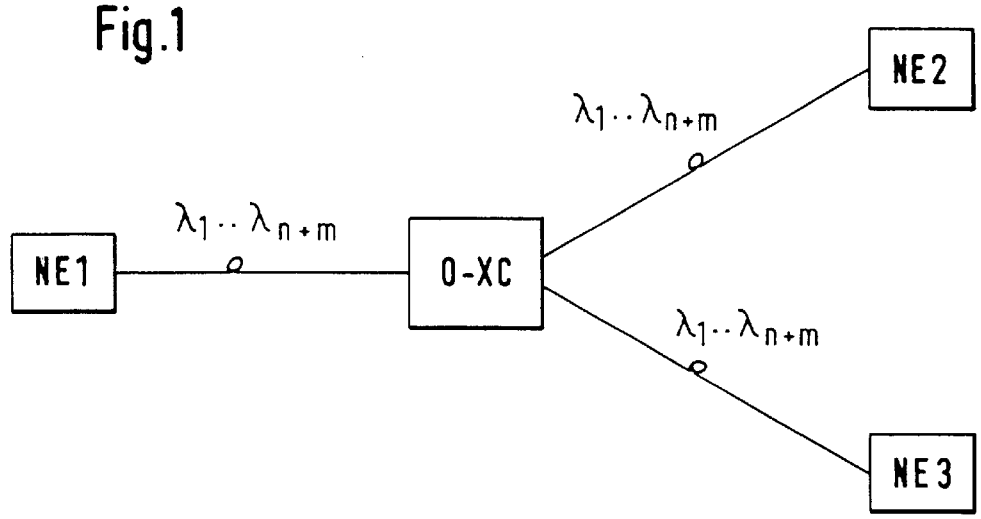
FIG. 1 is a schematic block diagram of a synchronous digital communications system according to the invention.

Referring to FIG. 1, a synchronous digital communications system comprises three network elements NE1, NE2, NE3, which are interconnected by optical lines. Connected between network elements NE1, NE2, NE3 is an optical cross-connect O-XC. Over the optical lines, e.g., glass optical fibers, optical signals are transmitted using wavelength-division multiplexing (WDM) or dense wavelength-division multiplexing (DWDM). N+m wavelengths are provided. The communications system is designed as a bidirectional transmission system. Wavelengths $\lambda_1$ to $\lambda_n$ are used for the transfer of signals from network element NE1 to network elements NE2, NE3. Wavelengths $\lambda_{n+1}$ to $\lambda_{n+m}$ are used for the transfer of signals from network elements NE2, NE3 to network element NE1; n and m are natural numbers, e.g., n=20, m=20.

The communications system represents the minimum version of a system which permits WDM over switched optical connections. The invention is also readily applicable to communications systems with more than three network elements, e.g., one thousand network elements, which are interconnected by a mesh network of optical cross-connects and add/drop multiplexers, for example. Generally, the invention is applicable to any synchronous communications system which interconnects at least three electric subnetworks via an optical subnetwork such that switched optical connections are possible.

Figure 2:
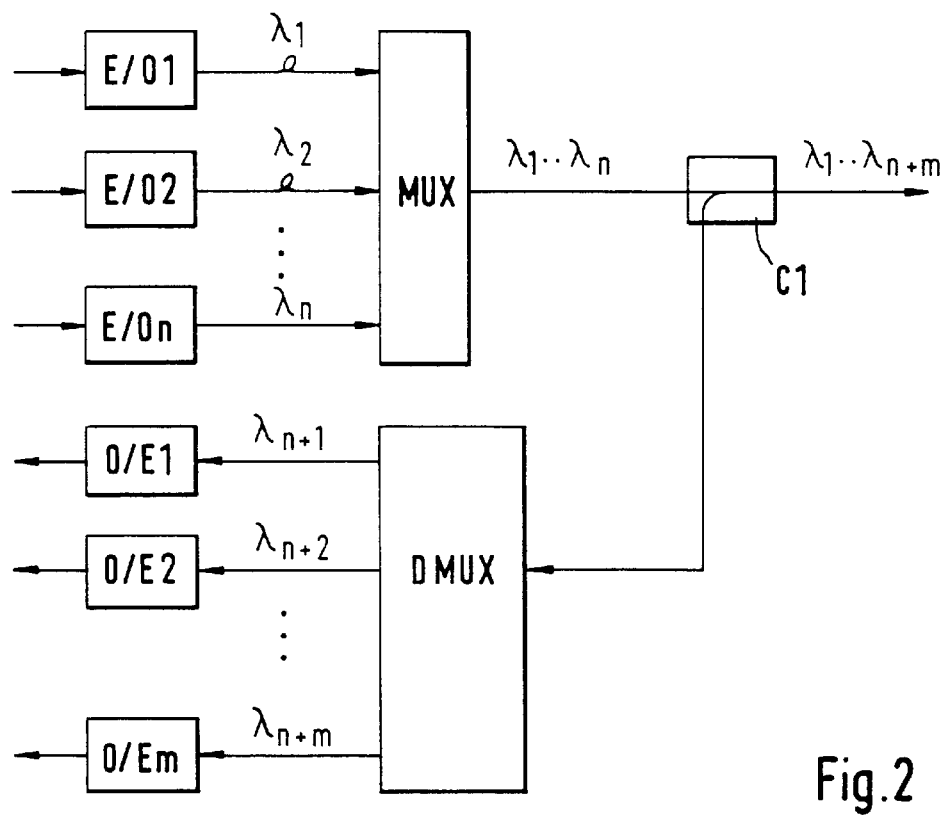
FIG. 2 is a schematic block diagram of a portion of the network element NE1 of FIG. 1.

Turning now to FIG. 2, there is shown a portion of network element NE1 of FIG. 1. Network element NE1 comprises n electrical-to-optical converters E/O1, E/O2, . . . , E/On and m optical-to-electrical converters O/E1, O/E2, . . . , O/Em. The n electrical-to-optical converters E/O1, E/O2, . . . , E/On serve to convert the electric signals transmitted via the interface units of network element NE1 from electrical to optical form. To that end, the first interface unit is connected to and permanently associated with electrical-to-optical converter E/O1, the second interface unit is connected to and permanently associated with electrical-to-optical converter E/O2, etc. Each electrical-to-optical converter E/O1, E/O2, . . . , E/On generates a different wavelength. All wavelengths $\lambda_1$ to $\lambda_n$ are combined in a multiplexer MUX, which is implemented as an optical combiner, for example. The combined wavelengths are simultaneously transmitted over the optical network.

The optical cross-connect switches optical connections and forwards the wavelengths assigned to the optical connections in accordance with their destination addresses. If, for example, information is to be transferred to network element NE2 over two optical channels, use will be made of, e.g., wavelengths $\lambda_2$ and $\lambda_3$, which will be switched through to network element NE2 by optical cross-connect O-XC. If, for example, information is to be transferred over two further optical channels to network element NE3, use will be made of, e.g., wavelengths $\lambda_4$ and $\lambda_5$, which will be switched through by optical crossconnect O-XC. In a further time period, information can, for instance, be transferred to network element NE2 at wavelengths $\lambda_2$ and $\lambda_5$ and to network element NE3 at wavelengths $\lambda_3$ and $X\lambda_4$.

To continuously ensure synchronization in the network, a nonswitched optical connection is provided, for example by reserving wavelength $\lambda_1$ for the permanent transfer of synchronization signals. For wavelength $\lambda_1$, a nonswitched optical connection is configured. Electrical-to-optical converter E/O1 is supplied with a synchronization clock generated in a primary reference source. The synchronization clock is transmitted to network element NE2 at the reserved wavelength $\lambda_1$. Alternatively, the synchronization clock can be transmitted at the reserved wavelength $\lambda_1$ to the optical cross-connect O-XC, which switches the reserved optical connection through to network element NE2 at a different wavelength, e.g., wavelength $\lambda_5$, thus transferring the synchronization clock to network element NE2. Network element NE2 synchronizes itself to the incoming clock. The synchronization clock can additionally be transferred at a second reserved wavelength to network element NE3. Network element NE3 then synchronizes itself to the synchronization clock received at the second reserved wavelength.

Network element NE1 receives information from network elements NE2 and NE3 via a fiber optic coupler C1 and a demultiplexer DMUX, which selects individual wavelengths and passes them on to optical-to-electrical converters O/E1, O/2, . . . , O/Em. Fiber optic coupler C1 extracts all wavelengths $\lambda_{n+1}$ to $\lambda_{n+m}$ from the optical fiber; n and m may also have different values. Demultiplexer DMUX is implemented as a wavelength-dependent splitter, for example. Each optical-to-electrical converter O/E1, O/E2, . . . , O/Em converts a different wavelength and passes the corresponding electric signal to a respective one of the interface units of network element NE1. If the master-slave approach (hierarchical synchronization) is used, all wavelengths $\lambda_{n+1}$ to $\lambda_{n+m}$ can be used for the transfer of information signals. If mutual synchronization is used, wavelengths $\lambda_{n+1}$ and $\lambda_{n+2}$, for example, are reserved for the synchronization signals of network elements NE2 and NE3, respectively, and are not switched, so that they can be used for information transfers from network elements NE2 and NE3 to network element NE1 only to a limited extent; the other wavelengths $\lambda_{n+3}$ to $\lambda_{n+m}$ can then be used for the transfer of information over arbitrarily switched optical connections.

If mutual synchronization is used, two, three, or four interface units of network element NE1, for example, are reserved for synchronization purposes and are permanently associated with electrical-to-optical converters and optical-to-electrical converters. The synchronization clock to be used is selected according to priority or on the basis of a higher quality of reception, for example.

What is claimed is:

1. A synchronous digital communications system for optically transmitting electric signals wherein the electric signals to be transmitted are converted from electrical to optical form (E/O1, E/O1, E/On) and then transmitted using wavelength-division multiplexing, comprising:

a plurality of optical lines providing optical connections, using a plurality of wavelengths ($\lambda_1$, $\lambda_n$) between network elements, wherein at least one optical connection is a nonswitched connection using at least one wavelength ($\lambda_1$), said at least one optical connection continuously transferring synchronization signals between network elements, and wherein at least one further optical connection is switched using at least one further wavelength ($\lambda_2$, $\lambda_n$), said at least one further optical connection transferring information between network elements.

2. A communications system as claimed in claim 1, further comprising:

at least three network elements (NE1, NE2, NE3), each network element comprising at least one electrical-to-optical converter (NE1, NE2, E/On), and at least one optical-to-electrical converter (O/E1, E/E2, O/Em), wherein said at least three network elements are interconnected by the plurality of optical lines via at least one optical cross-connect (O-XC), and that said at least one optical cross-connect (O-XC), connected between the network elements (NE1, NE2, NE3), wherein said at least one optical cross-connect (O-XC) is adapted to use individual wavelengths ($\lambda_2$, $\lambda_n$) with the exception of the at least one, nonswitched wavelength ($\lambda_1$) to route information signals from one network element (NE1, NE2, NE3) to another network element (NE1, NE2, NE3) over the at least one further optical connection which is switched.

3. A communications system as claimed in claim 1, further comprising:

at least three network elements (NE1, NE2, NE3) interconnected by optical lines, wherein the network elements (NE1, NE2, NE3) are SDH or SONET elements, and a primary reference source generating at least one synchronization clock, wherein between the network elements (NE1, NE2, NE3), hierarchical synchronization is established by the at least one nonswitched optical connection to transmit said at least one synchronization clock over predetermined paths.

4. A communications system as claimed in claim 1, further comprising: at least three network elements (NE1, NE2, NE3) interconnected by optical lines, wherein the network elements (NE1, NE2, NE3) are SDH or SONET elements, and a primary reference source generating at least one synchronization clock, wherein between the network elements (NE1, NE2, NE3), mutual synchronization is established by the at least one nonswitched optical connection to transmit said at least one synchronization clock over predetermined paths.

5. A communications system as claimed in claim 1, further comprising:

at least three network elements (NE1, NE2, NE3) interconnected by optical lines, a synchronization manager is adapted to configure dedicated synchronization links between the at least three network elements (NE1, NE2, NE3) over the at least one nonswitched optical connection, and a connection manager is adapted to configure communication links between the at least three network elements (NE1, NE2, NE3) from a pool of optical connections in which the dedicated synchronization links are marked, without switching the synchronization links.

6. A method of optically transmitting electric signals wherein the electric signals to be transmitted are converted from electrical to optical form (E/O1, E/O2, E/On) and then transmitted using wavelength-division multiplexing, comprising steps of:

configuring at least one optical connection as a nonswitched connections using at least one wavelength ($\lambda_1$);

continuously transferring synchronization signals via the configured at least one optical connection; switching at least one further optical connection using at least one further wavelength ($\lambda_2$, $\lambda_n$); and transferring information via the switched at least one further optical connection.

7. A method as claimed in claim 6, further comprising:

establishing, in a synchronous communications system comprising at least three network elements (NE1, NE2, NE3), dedicated, nonswitched synchronization links between the at least three network elements (NE1, NE2, NE3) for the permanent transfer of at least one synchronization clock, said dedicated, nonswitched synchronization links comprising the at least one optical connection configured in said step of configuring.

* * * * *